US011271998B1

(12) United States Patent
Arcara et al.

(10) Patent No.: US 11,271,998 B1
(45) Date of Patent: Mar. 8, 2022

(54) METHOD AND SYSTEM FOR PROVIDING CONTINUOUS OPERATION ON E-MAILS INDEPENDENTLY OF A FAILURE

(71) Applicant: Zextras S.r.l., Milan (IT)

(72) Inventors: Luca Arcara, Milan (IT); Paolo Remo Storti, Milan (IT)

(73) Assignee: Zextras S.r.l., Milan (IT)

( * ) Notice: Subject to any disclaimer, the term of this patent is extended or adjusted under 35 U.S.C. 154(b) by 0 days.

(21) Appl. No.: 17/073,571

(22) Filed: Oct. 19, 2020

(51) Int. Cl.
*G06F 15/16* (2006.01)
*H04L 67/1034* (2022.01)
*H04L 67/1097* (2022.01)
*H04L 51/42* (2022.01)

(52) U.S. Cl.
CPC .......... *H04L 67/1034* (2013.01); *H04L 51/22* (2013.01); *H04L 67/1097* (2013.01)

(58) Field of Classification Search
CPC . H04L 67/1034; H04L 51/22; H04L 67/1097; H04L 69/40
USPC .................................................. 709/206, 224
See application file for complete search history.

(56) References Cited

U.S. PATENT DOCUMENTS

| | | | | |
|---|---|---|---|---|
| 8,244,914 B1* | 8/2012 | Nagarkar | ............. | G06Q 10/107 709/248 |
| 2005/0228867 A1* | 10/2005 | Osborne | ................. | H04L 51/30 709/206 |
| 2006/0026250 A1* | 2/2006 | Ito | ........................... | H04L 51/22 709/206 |
| 2007/0038714 A1* | 2/2007 | Sell | ......................... | H04L 51/34 709/206 |
| 2007/0143374 A1* | 6/2007 | D'Souza | ............. | G06F 11/2028 |
| 2007/0168692 A1* | 7/2007 | Quintiliano | ......... | G06F 11/2028 714/4.1 |
| 2009/0006860 A1* | 1/2009 | Ross | ..................... | H04L 63/126 713/189 |
| 2009/0172116 A1* | 7/2009 | Zimmet | ................ | H04L 51/066 709/206 |
| 2009/0327519 A1* | 12/2009 | Thiel | ....................... | H04L 69/40 709/239 |
| 2013/0159428 A1* | 6/2013 | Soundararajan | .... | G06F 9/45533 709/206 |
| 2016/0088115 A1* | 3/2016 | Agnew | .................. | H04L 51/26 709/206 |
| 2017/0315885 A1* | 11/2017 | Aboel-Nil | ............... | H04L 51/14 |

* cited by examiner

*Primary Examiner* — Johnny B Aguiar
(74) *Attorney, Agent, or Firm* — Dickinson Wright PLLC; Andrew D. Dorisio

(57) ABSTRACT

A method for providing continuous operation on e-mails includes providing a first server located at a first position and acting as mailstore for the user at the user computing device, providing at least one second server located at a second position different from the first position, and providing a third server located at a third position different from the first and second positions. Upon failure of the first server, the method involves preparing the second server to act as mailstore in the place of the first server, the preparing step comprising sending a signal to the second server to find data of the third server by means of pointers, store data in the second server, and convert the data respectively to raw data and metadata and storing the raw data and metadata in the second server.

9 Claims, 3 Drawing Sheets

METHOD AND SYSTEM FOR PROVIDING CONTINUOUS OPERATION ON E-MAILS INDEPENDENTLY OF A FAILURE

FIELD OF THE INVENTION

The present invention concerns a method and system for providing continuous operation on e-mails independently from a failure.

BACKGROUND ART

Currently data processing systems, such as e-mail management systems, include some database servers that support several users on a network. The so-called "mailstore servers" are the network components that perform all the operations and physically manage all the resources relating to each e-mail account; they physically comprise a central processing unit (CPU) and a memory to store the data related to the e-mails of each account.

Normally every e-mail message includes metadata and raw data, where the raw data are the texts of the messages while the metadata are the attributes of the message; when an e-mail message arrives, the metadata are recorded in a first memory and the raw data are saved in a second memory and a path is created between raw data and metadata, and the said path has an identification code.

However, if the mailstore server where the messages relating to some accounts are kept fails, the e-mails may be lost without the possibility to recover them. For this reason, the systems that manage e-mails are equipped with software and/or hardware structures to ensure continuous operation on e-mails independently of a failure and to increase the reliability of the system.

One of the structures currently in use consists in the complete replication of the messages relating to the accounts of a main mailstore server in another auxiliary mailstore server; in this way, in the event of a failure in the main mail store server, the auxiliary mail store server will replace it in all its functions. However, with this system, the auxiliary mailstore server must have the same network configuration as the main mailstore server and this requires a doubling of the network between the mailstore servers of the device and the external environment With the use of the aforementioned technique, it is difficult to obtain high reliability and high fault tolerance for e-mail management systems. To obtain high reliability (High Availability, HA) a system must have a recovery point objective (RPO)=0, i.e. zero data loss, and a recovery time objective (RTO) tending to zero, where the RTO of an application or data establishes the maximum period of time acceptable to a company or other organisation without the availability of the application or data; an RTO equal to 0 means that the said data or application must always be available in a continuous manner. Fault Tolerance (FT) is the ability of a system to continue to work properly in the event of a failure of one or more components.

Each main mailstore server requires the presence of an auxiliary mailstore server; the replication in the auxiliary mailstore server of the same functions and connections of the main mailstore server can lead to the impossibility of using the auxiliary mailstore server in the event that the main mailstore server has a failure.

For this reason, there is usually supervision management software and also auxiliary hardware to make the replacement operation of the failed mailstore server reliable. However, the use of these systems requires a dedicated network that can interfere with the data transfer and does not allow the improvement of data security since all instructions are replicated in the auxiliary server, including incorrect commands not related to transactions, involuntary changes to data due to unauthorised accesses, viruses, etc.

In view of the background art, the object of the present invention concerns a method and system, different from known ones, for providing continuous operation on e-mails independently of a failure.

SUMMARY OF THE INVENTION

According to the present invention, the said object is achieved by means of a method, as stated in claim 1.

The invention also concerns a data processing system comprising means to implement the method.

Finally, the invention also relates to an e-mail management apparatus comprising the said data processing system.

BRIEF DESCRIPTION OF THE FIGURES

The characteristics and advantages of the present invention will become apparent from the detailed description that follows, from the embodiments provided as illustrative, non-limiting examples in the figures annexed hereto, in which.

DETAILED DESCRIPTION OF THE INVENTION

The invention therefore relates to a method for providing continuous operation on e-mails, the method comprising the steps of Providing a first server (A) located at a first position, said first server acting as mailstore for the user at the user computing device;

Providing at least one second server located at a second position different from the first position;

Providing a third server located at a third position different from the first and second positions;

Providing means for data transfer among said first, second and third server;

Providing a communication protocol (ZxLink) between said first and third server and between said third and second server;

Providing a management software including a first module in said first server, a second module in said second server and a main module in said third server, said first module comprising:

Verifying if a new e-mail or a new e-mail iteration in the first server is valid or not;

If the new e-mail or the new iteration of e-mail is valid, extracting from the new e-mail or the new iteration of e-mail metadata and raw data;

Converting said raw data in first data and said metadata in second data;

Transferring said first data and said second data to the third server, said main module comprising:

Verifying if said second data are present in a memory allocation of the third server; if said second data are not present, storing said second data in a memory allocation of the third server and sending said second data to said second server for storing them in the second server, Verifying if said first data are present in a memory allocation of the third server; if said first data are not present, storing said first data in a memory allocation of the third server and sending instructions to said second module of the second server so that said second module form pointers to said first data stored in the third server, Monitoring said first server, If said first server fails, preparing said second server to act as mailstore in the place of said first server, the preparation step comprising sending a signal to said second module of said second server so that said second module implements the following:

Finding said first data of the third server by means of said pointers and storing said first data in said second server.

Converting said first and second data respectively into raw data and metadata and storing said raw data and meta data in said second server.

Figure 1:
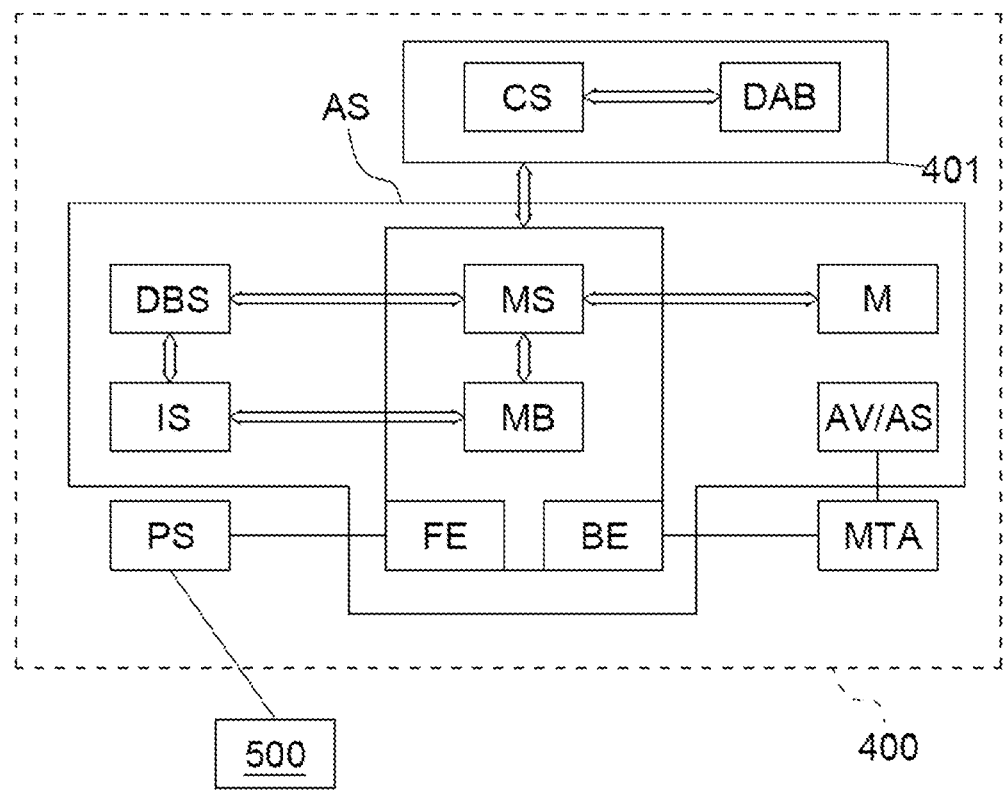
FIG. 1 is a diagram of the Zimbra architecture.

A known system for managing emails is the Zimbra architecture comprising a plurality of servers, each with a set task. Zimbra 400 architecture is shown in FIG. 1 and comprises:

a server 401 comprising:
 a Configuration Server CS software, which centrally saves and makes available all the configurations relating to the infrastructure to the individual servers that compose it, as well as to the e-mail domains that are managed by the infrastructure,
 a Directory Address Book (DAB) software, which saves and centralises all the configurations relating to the users of the infrastructure, such as name, e-mail address, password hash or membership to a group or class of service. The Configuration Server (CS) software together with the Directory Address Book software behaves like lightweight directory access protocol (LDAP) software for the Zimbra 400 architecture;

Zimbra 400 architecture comprises: a Mail Transport Agent (MTA) server that sends and receives e-mails using the simple mail transfer protocol (SMTP) and an Application server (AS).

The application server AS includes Antivirus and AntiSpam AV/AS software that filters the e-mails containing viruses or that are identified as spam, and which is connected to the MTA server;
 The applications that manage the "BackEnd" BE and "FrontEnd" FE software. The BackEnd provides all the application and domain logic to manage the internal data flow necessary for the features set out, such as the composition and sending of e-mails, editing of a document, receipt of a message; the BackEnd is connected with the MTA server. The "FrontEnd" deals with the graphic interactions with the user computer 500, such as the visualisation of Web interfaces;
 A Database DBS that saves all the information relating to the objects managed by the application server AS, such as the metadata associated with an e-mail, the data of the connection sessions or the structure of the disks and local storage means;
 An Index Server IS that indexes all the contents of the e-mails in order to perform generic searches both of the values of specific attributes and of the generic content of the e-mails.

Zimbra architecture also includes a Proxy Server (PS) which acts as a single access point for all incoming connections, centralising the use of transport layer security (TLS) protocols, authentication and re-routing of communications between the client that initiated the connection and the server that will have to provide the answer. The Proxy Server is connected with the FrontEnd software of the Application Server and with at least one user via the user computer 500. All servers are installed with operating software and physically include a CPU and a memory for storing data.

From an application point of view, all transactions of interest take place within the "Mailstore" MS component of the Application Server AS which is created by a series of Java processes managed by the "mailboxd" MB software, and executed within the Application Server.

The Mailboxd process performs and manages all logical operations; the Mailboxd process requires and uses system resources for the use of random-access memory (RAM), CPU, Hard Disk or allocation on the database.

In practice, the Mailstore is the "brain" of the entire infrastructure, which organises and executes every transaction of the accounts directly related to it. There may be several Mailstores in an infrastructure, but all the decisions (transactions) concerning an account are made exclusively by a single Mailstore.

The single transactions are organised in a series of single steps in the various subsystems, which are connected to each other.

For example, when a new e-mail arrives, the Mailstore saves the metadata in the database DBS, which associates them with an identifier (ID) of the server IS. Then it saves the raw data, i.e. the complete content of the e-mail, in a memory M, using the ID as file name.

Similarly, if a user searches for e-mails, the Mailstore will query the server IS and retrieve the identified ID of the e-mail to be displayed via the user interface.

Figure 2:
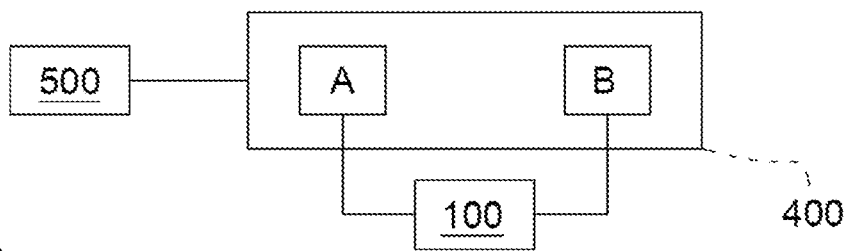
FIG. 2 is a diagram of the system for providing continuous operation on e-mails independently of a failure, according to an embodiment of the present invention.
Figure 3:
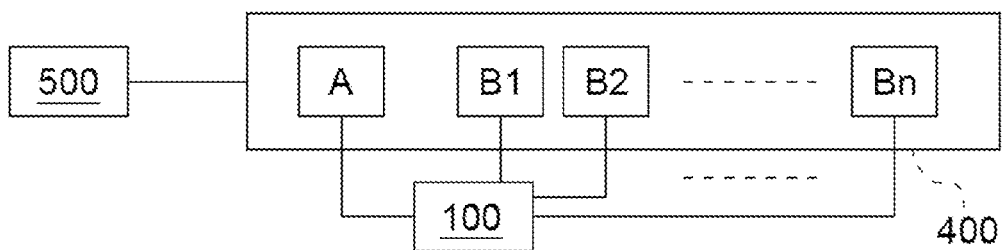
FIG. 3 is a diagram of the system for providing continuous operation on e-mails independently of a failure, according to a variant of the embodiment of the present invention.

FIG. 2 shows a system for providing continuous operation on e-mails independently of a failure, according to an embodiment of the present invention, in particular a system for providing continuous operation on e-mails for the user on a user computer. The system comprises a first server A which acts as a mail store for at least one user on a user computer 500, but preferably for a plurality of users on the respective user computers, where a user computer is intended as a device capable of receiving and sending e-mails, such as a personal computer, tablet, smartphone, etc.; e-mails relating to a certain number of accounts are normally managed and stored in the mailstore A. The system includes at least a second server B capable of intervening to replace the mailstore A in case of failure or malfunction of the latter; server B is therefore set up to act as a mailstore. Preferably, the system comprises a plurality of servers B1 . . . Bn, each set up to act as mailstore and capable of intervening to replace the mailstore A in the event of its failure or malfunction, according to a variant of the embodiment of the invention described in FIG. 3. The system comprises a server 100 that contains the ZxHA control software, which belongs to the system management software according to the invention and of which the ZxHA software represents the main module; the server 100 is a separate server from servers A and B (as shown in FIG. 2). Servers A, B and 100 are located in different positions and preferably geographically distant from each other, for example located in different buildings in the same city, but they are part of an apparatus for managing emails that communicates with the user via the user computer 500; in the case of a plurality of servers B1 . . . Bn the servers B1 . . . Bn are arranged in a plurality of different positions from each other. All servers A, 100 and B or B1, B2 . . . Bn are installed with operating software and physically include a CPU and a memory for storing data.

A data communication line 200 is envisaged between servers A and B and server 100 in the event that server 100 is separate from servers A and B.

Preferably, according to the invention the system is totally or partially arranged within the Zimbra architecture shown in FIG. 1; in particular the mailstore A becomes the mailstore MS of the Zimbra architecture, the server B or the plurality of servers B1 . . . Bn are arranged inside the Zimbra 400 architecture and the server 100 can be placed outside or inside the Zimbra 400 architecture. However, according to the invention the system can be arranged inside other mail management devices that do not coincide with the Zimbra architecture. As better visible in FIG. 4, the mailstore A features the ZxM and ZxR software modules. The ZxM module allows the representation by means of Zxmeta data of metadata, which are data that describe the state of an object at a specific time; Zxmeta data are preferably textual representations of metadata in JSON format. The ZxR module allows the representation of raw data using Zxraw data, which are data that identify the content associated with the object; Zxraw data are preferably compressed files identified by a Hash function. Each raw data associated with a given object is identified by a Hash function so that two equal raw data have the same Hash function; in this way the identical contents received at different times are stored only once. ZxM and ZxR modules make it possible to create Zxmeta and Zxraw data from metadata and raw data extracted from an object.

Server B is equipped with the ZxMc and ZxRc software modules, which are configured to convert the received Zxmeta and Zxraw data into metadata and raw data.

The system according to the invention comprises a software ZxLis installed in the mailstore A, which represents another module of the system management software according to the invention; the said software ZxLis implements the functions of intercepting every new e-mail or every interaction regarding e-mails and is able to identify and distinguish user interactions from those initiated autonomously by the system. The term interaction refers to a new appointment, document, contact or even configuration options of an e-mail or even a change of password and more. The interaction is identified by checking the author of the interactions. Each interaction is executed by an "operator" in relation to a "target". The user is normally both operator and target since he operates on his own e-mails, while for example a message that is received runs on the server that operates on the user (the "server" operator receives the e-mail and registers it in the correct account). Simplifying, all the operations that have the user as "operator" are recorded, while the operations that have the server as operator are discarded, except for e-mail receipt operations. This operation is managed by an algorithm belonging to the software ZxLis; the algorithm verifies that the requested action contained in the interaction or in the new e-mail belongs to a list of authorised actions contained in the database DB and if the verification is positive it considers the new e-mail or the interaction that contains the action requested as valid. Therefore, the software ZxLis examines all the events or objects EV that are managed by the mailstore A and evaluates whether these events are valid or not, that is if these events are new e-mails or interactions regarding a user's e-mails or in any case valid event; it then extracts from the valid events the texts of the e-mail messages, documents or other attachments, i.e. the raw data, which it sends in the form of Zxraw data to the control software ZxHA; moreover, it extracts the attributes of the e-mails or interactions, i.e. the metadata, from said valid events EV, and sends them in the form of Zxmeta data to the control software ZxHA of the server 100.

Zxraw data and Zxmeta data are sent through the communication line 200 by means of a communication protocol ZxLink, which maximizes the use of the available bandwidth also increasing the latency (by about ten seconds) for the transmission of Zxraw data, as many megabytes may be used to send text messages, documents or similar, while ensuring a synchronous low latency communication channel (<50 ms) for Zxmeta data transmission.

The system, according to the invention, includes software ZxCons installed on server B, which represents another module of the system management software according to the invention; it communicates with the control software ZxHA to store the Zxmeta data arriving from the control software ZxHA in server B. It also communicates with the software ZxHA to create pointers P on memory allocations, in particular on the hard disk memory of server 100, where the Zxraw data of the server 100 are stored.

The control software ZxHA allocated in server 100 controls servers A and B and manages communications between the software modules ZxLis and ZxCons. Server 100 has a memory 101 where the database ZxClusterDB is installed, which contains the various Zxmeta data and has a memory 102 where the component ZxObjectStorage used to store Zxraw and Zxmeta data is installed. Server B includes pointers P to memory allocations 102 where the component ZxObjectStorage is installed and where Zxraw data are stored.

The software ZxHA receives the data package comprising metadata and raw data in the form of Zxmeta and Zxraw data from the module ZxLis and evaluates whether it is necessary to update the metadata associated with the object in the database ZxClusterDB or in the component ZxObjectStorage of memory 102 and whether it is necessary to store a new version of the raw data in memory 102. If it is necessary to update the Zxmeta data, the software ZxHA updates the Zxmeta data and stores them in the memory allocation 102 of the server 100 and sends the update to the software module ZxCons of the server B. The software ZxHA compares the new Zxraw data with the list of Zxraw data present in the component ZxObjectStorage of memory 102 and if said new Zxraw data are not present, it stores said new Zxraw data in the component ZxObjectStorage and sends instructions to the software module ZxCons of the server B to create inside it the pointers P to the new Zxraw data stored in the component ZxObjectStorage of the memory 102 of the server 100; preferably the pointers P that are created by the software ZxCons have the same Hash functions as the Zxraw data.

Figure 4:
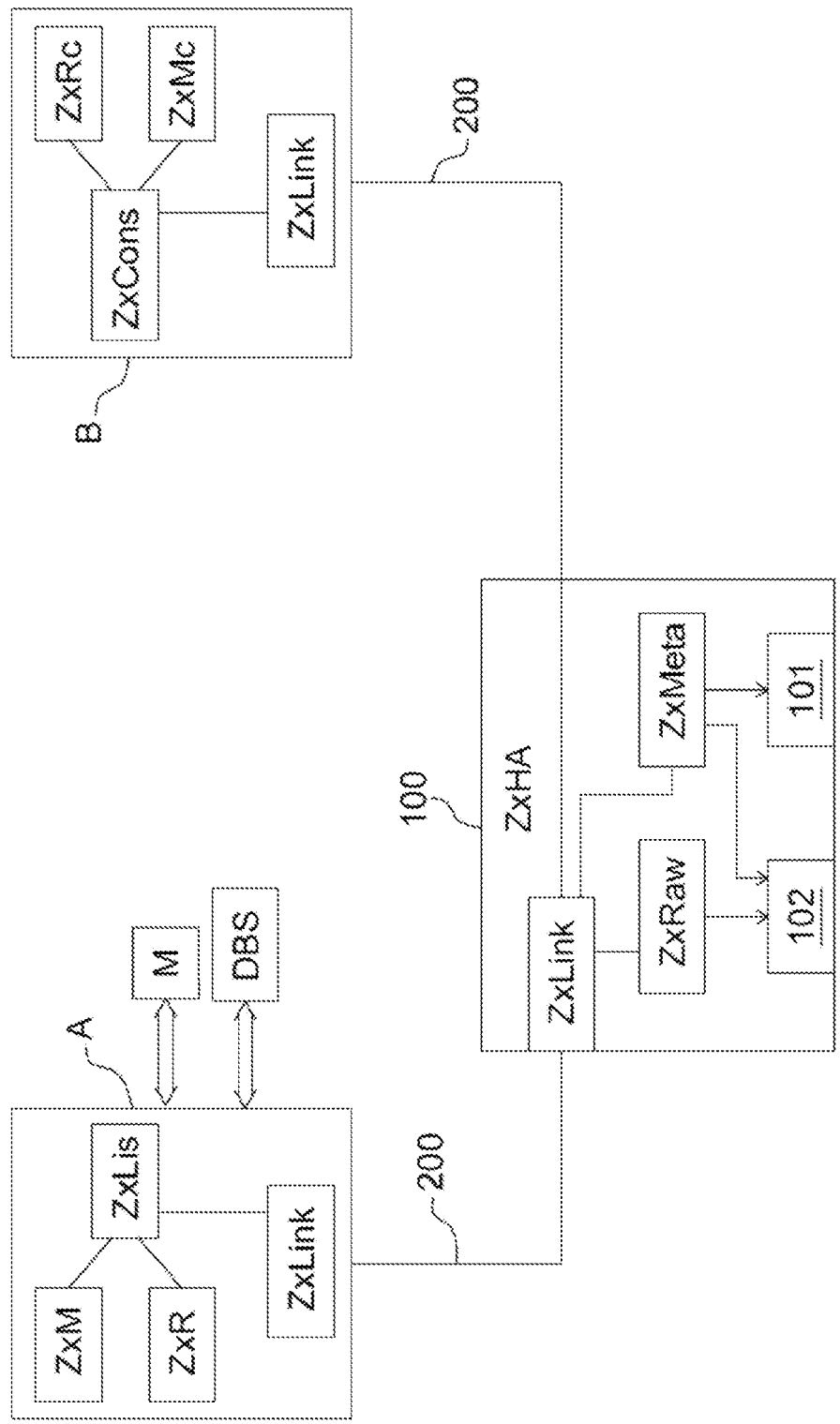
FIG. 4 is a more detailed diagram of a part of the system according to the present invention.
Figure 5:
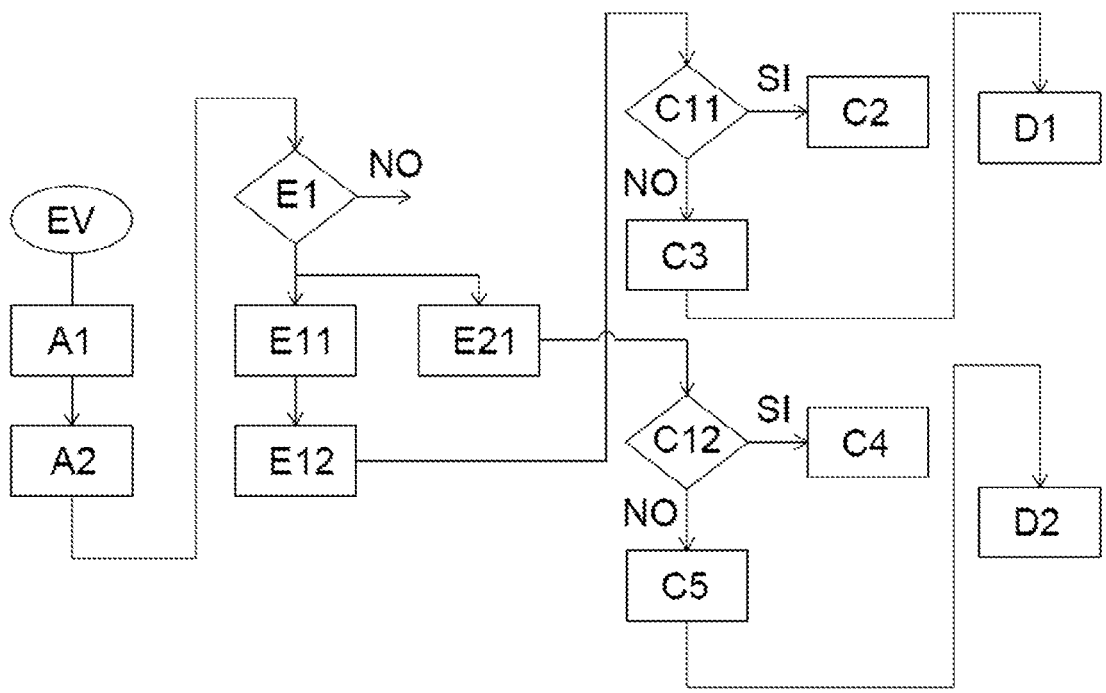
FIG. 5 is a flow diagram of the method related to the system according to the invention in standard conditions.
Figure 6:
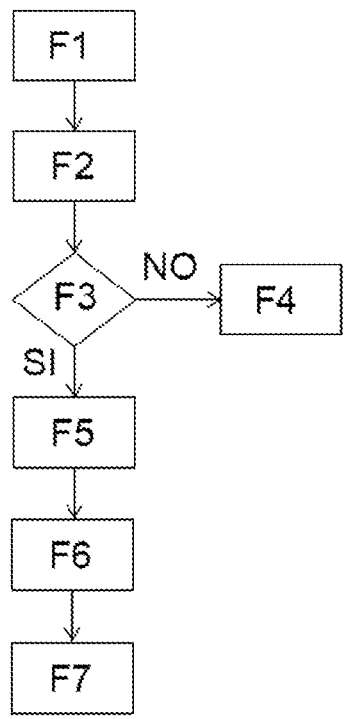
FIG. 6 is a flow diagram of the method related to the system according to the invention in the event of failure of mailstore A.

FIG. 4 shows a flow chart relating to a standard operation performed by the system in accordance with the invention. When an event EV occurs, i.e. a new e-mail or an interaction regarding e-mails, mailstore A processes the event and updates metadata in its database DBS (phase A1), assigns an ID to the event and if there are new raw data it extracts them and stores them in a memory M (phase A2).

The software ZxLis examines (phase E1) the event EV and if the event is valid it extracts (phase E11) the metadata from the database DBS, generates (phase E12) the corresponding Zxmeta data and sends them to the ZxHA software of server 100. Furthermore the software ZxLis extracts, if there are any, the raw data from memory M (Phase 21) generates the corresponding Zxraw data and sends them to the software ZxHA of server 100.

The software ZxHA evaluates (phase C11) whether it is necessary or not to update the metadata associated with the event EV sent via the Zxmeta data; if the update is not necessary, it does not perform any action (phase C2). The software ZxHA evaluates (phase C12) whether it is necessary or not to store the received Zxraw data in the event that said Zxraw data are or are not already present in the component ZxObjectStorage by comparing said Zxraw data received with the list of Zxraw data present in server 100; if the Zxraw data are already present in the component ZxObjectStorage, the update is not necessary and therefore the software ZxHA does not perform any action (phase C4). If the Zxmeta data relating to the event EV object are updated (phase C3) in memory allocation 102, the update is sent to the software ZxCons of server B which updates the internal database of Zxmeta data (phase D1). If it is also necessary to store the new Zxraw data received relating to the event EV (phase C5), the Zxraw data relating to the EV event are stored in the component ZxObjectStorage of the memory 102 of the server 100. Furthermore, the software ZxHA sends instructions to the software module ZxCons of server B to create pointers P to the new Zxraw data stored in server 100 within server B (phase D2).

One of the services provided by the software ZxHA is the monitoring of the infrastructure, in order to identify whether server A is under-loaded or not operational. The monitoring process is performed using the "heartbeat" algorithm, which constantly analyses every response—or lack of response—from the mailstore A.

The ZxLis and ZxCons software of servers A and B send information about their status to the software ZxHA of server 100 which includes:
network status (latency, packet loss rate/error)
server load (CPU/Memory)
disk status
application call latency
The packet of said information is called heartbeat packet.
ZxLis/ZxCon software are also able to intercept automatic or manual restarts of services.

In the event of a manual stop of the service—performed by a user—the software ZxHA receives a notification that warns it that the servers will no longer send this information in the future. In this way the software ZxHA will not consider such problems as failure events.

When the stop performed by the user ends, the service ZxHA will start receiving notifications and status updates again.

On the other hand, in the event of an automatic restart, mailstore A notifies the software ZxHA that mailstore A is in a critical state in phase F1, as shown in FIG. 4, and a warning phase F2 of the software ZxHA of server 100 is activated.

In the next phase F3, the software ZxHA keeps all this information and analyses the trends associated with the metrics it has received. For mailstore A, information is collected and analysed on the following:

manual start or stop of services with exact timestamp
automatic restart with exact timestamp
number and interval of information packets not received
server load in every instant and trend
application load in every instant and trend
network and application latency and trend.

For example, in the event that mailstore A, which is in a critical state, reports an increasing growth trend in server load or application load, the software ZxHA notifies the administrator of the situation, considers mailstore A faulty and begins the Failover process (phase F5), i.e. the process of replacing mailstore A with server B; if the growth trends are normal, the Failover process is not activated (phase F4).

Preferably, if a mailstore A does not send the heartbeat packet for more than a defined interval, the software ZxHA—in order to avoid false positives caused by network problems—asks the other system mailstores, if the system includes a plurality of servers B1 Bn, to confirm the unavailability of mailstore A and, once quorum is reached, the software ZxHA notifies the administrator and starts the Failover process, i.e. the process of replacing mailstore A with one of the servers B1, B2 . . . Bn.

In the event that Mailstore A is unavailable, the software ZxHA considers mailstore A to be faulty and begins the Failover process (F5), i.e. it prepares server B to be used as mailstore instead of mailstore A. The software ZxHA sends a signal to the software Zcons of server B, so that said second module implements the following steps:
Retrieve the Zxraw data of server 100 by means of said pointers P which point to the memory allocations which contain the Zxraw data of server 100 and store said Zxraw data in server B (phase F6),
Convert Zxraw and Zxmeta data respectively to raw data and metadata and store them in the second server B (F7).

The software ZxHA of server 100, always in phase F6, promotes the accounts attested on Mailstore A using server B, i.e. the software ZxHA of server 100 sends a signal to the proxy server PS to request the update of the routing tables, which are temporary tables that the proxy server PS creates and which register which server each user belongs to. To replace the pointing of one user (or all) from mailstore A to server B the following activities are required:
set the user to "in maintenance" status—the messages that arrive will be "parked" waiting to be delivered
update the LDAP of the mail management system
update or delete the old value in the routing tables
reactivate the user
set mailstore A as "unreachable" or offline
remove mailstore A from the "authoritative" servers that can authenticate the user (being switched off or not working it would cause a problem).

Once the tables have been updated, the new emails and new connections are sent by the MTA and PS servers directly to Mailstore B, thus ensuring the continuity of operations regarding the e-mails and the compliance with the High Reliability and Fault Tolerance limitations.

Furthermore, since the ZxList and ZxCon components can be installed on the same server, and considering that replication is configured for each single account, using the same infrastructure it is possible to define an N−1 redundancy system, having as only limited the capabilities of the single server.

The system, according to the invention, protects data from hardware failures and possible low-level corruption. It does not require any dedicated network or additional hardware that must be manually configured in the system. It does not require any changes to the addressing system of the Zimbra servers.

In particular, the system according to the invention makes it possible to reduce the memory allocations for a High reliability solution, since thanks to the presence of the pointers to the database of the server 100, it minimises the size of the memory of the server B. This makes it possible to use smaller and faster storage systems. Furthermore, there is an improvement in the RPO factor which is reduced to 0 since all raw data and metadata, i.e. all new e-mails or valid interactions, are saved externally on the server 100.

There is also an improvement in the RTO factor, which is reduced to a few seconds thanks to the presence of the pointers in server B that provide for the recovery of raw data in a few seconds.

The software ZxHA can balance restore operations, performing them in parallel on different servers and avoiding the overload of a single server during the Failover process. For example, in an N Mailstore infrastructure, in which each node contains M accounts, N−1 processes can be run each for M/(N−1) users, improving overall performance both in the restore and post-failover stage.

The invention claimed is:

1. A method for providing continuous operation on e-mails, the method comprising the steps of:
  Providing a first server (A) located at a first position, said first server acting as mailstore for a user at a user computing device,
  Providing at least one second server (B, B1 . . . Bn) located at a second position different from the first position;
  Providing a third server (100) located at a third position different from the first and second positions,
  Providing a means (200) for data transfer among said first, second and third server;
  Providing a communication protocol (ZxLink) between said first and third server and between said third and second server;
  Providing a management software including a first module (ZxLis) in said first server, a second module (ZxCons) in said second server and a main module (ZxHA) in said third server,
  Wherein said first module performs the steps of:
    Verifying (E1) whether a new e-mail or a new e-mail iteration in the first server is valid or not
    When the new e-mail or the new e-mail iteration is valid, extracting (E12, E12) from the new e-mail or the new e-mail iteration metadata and raw data,
    Converting said raw data to first data (Zxraw) and said metadata to second data (Zxmeta)
    Transferring said first data and said second data to the third server,
  Wherein said main module performs the steps of:
    Verifying (C11) whether said second data are present in a memory allocation of the third server; when said second data are not present, storing said second data in the memory allocation (101, 102) of the third server and sending said second data to said second server for storing in the second server,
    Verifying (C12) whether said first data are present in the memory allocation (101) of the third server; when said first data are not present, storing said first data in the memory allocation (101, 102) of the third server and sending instructions to said second module of the second server, wherein said second module forms pointers to said first data stored in the third server,
  Monitoring said first server (F1, F2)
  When said first server fails (F4), preparing said second server to act as mailstore in place of said first server (F5), the preparing step comprising sending a signal to said second module of said second server, and
  Wherein said second module implements the steps of:
    Finding (F6) said first data of the third server by means of said pointers and storing said first data in said second server,
    Converting (ZxMc, ZxRc, F7) said first data back to said raw data and said second data back to said metadata and storing said converted raw data and said converted metadata in said second server.

2. The method of claim 1, wherein said first data (Zxraw) comprise compressed files identified by a Hash function and said second data (Zxmeta) comprise metadata textual representations according to a JavaScript Object Notation (JSON) representation.

3. The method of claim 2, wherein said pointers (P) contain the Hash function of said first data.

4. The method of claim 1, wherein said step of verifying whether the new e-mail or the new e-mail iteration in the first server is valid or not includes further verification that a required action contained in the new e-mail iteration or the new e-mail belongs to an authorized action list; wherein when the further verification step is positive the new e-mail or the new e-mail iteration containing the required action is considered valid.

5. The method of claim 1, wherein said step of preparing said second server to act as mailstore in the place of said first server (F5) includes promoting accounts attested on the first server using the second server.

6. The method of claim 1, wherein said second position of said second server is geographically remote from the first position and the third position of the third server is geographically remote from the first and the second position.

7. The method of claim 1, further comprising a plurality of second servers (B1, B2 . . . Bn) located in a plurality of different positions.

8. A data processing system comprising:
  a first server located at a first position, said first server adapted to act as a mailstore for a user at a user computing device, wherein the first server is adapted to operate a first software module (ZxLis);
  a second server located at a second position different from the first position, wherein the second server is adapted to operate a second software module (ZxCons);
  a third server located at a third position different from the first position and the second position, wherein the third server is adapted to operate a main software module (ZxHA);
  a means for data transfer among the first server, the second server, and the third server, said means for data transfer adapted to operate according to a communication protocol (ZxLink);
  wherein the first server is adapted to validate whether a new e-mail or a new e-mail iteration is valid or not, and wherein when the new e-mail or the new e-mail iteration is determined to be valid, the first server is further adapted to
    extract metadata and raw data from the new e-mail or the new e-mail iteration;
    convert the raw data to first data (Zxraw) and the metadata to second data (Zxmeta); and transfer said first data and said second data to the third server;

wherein the third server is adapted to utilize the main software module to verify whether the second data are present in a memory allocation of the third server, and wherein when the second data are not present, the third server is adapted to store the second data in the memory allocation of the third server and send the second data to the second server for storing in the second server;

verify whether the first data are present in the memory allocation of the third server, and wherein when the first data are not present, the third server is adapted to store the first data in the memory allocation of the third server and send instructions to the second software module of the second server to form pointers to said first data stored in the third server; and monitor the first server, and wherein when the first server fails, the third server is further adapted to prepare the second server to act as mailstore in place of the first server by sending a signal to the second software module of the second server;

wherein the second server is adapted to receive the signal and in response to the signal, the second server is further adapted to find the first data of the third server by means of said pointers and store said first data in said second server; and convert said first data back to said raw data and said second data back to said metadata and store the converted raw data and the converted metadata in the second server.

9. An e-mail management apparatus comprising the data processing system of claim 8.

\* \* \* \* \*